United States Patent
Huang et al.

(10) Patent No.: US 10,094,599 B2
(45) Date of Patent: Oct. 9, 2018

(54) OIL RETURN METHOD FOR MULTI-SPLIT AIR CONDITIONING IN HEATING

(71) Applicant: Gree Electric Appliances, Inc. of Zhuhai, Zhuhai, Guangdong (CN)

(72) Inventors: Chun Huang, Zhuhai (CN); Peigang Song, Zhuhai (CN); Hexin Liu, Zhuhai (CN); Zebin Chen, Zhuhai (CN); Qunbo Liu, Zhuhai (CN)

(73) Assignee: GREE ELECTRIC APPLIANCES, INC. OF ZHUHAI (CN)

( * ) Notice: Subject to any disclaimer, the term of this patent is extended or adjusted under 35 U.S.C. 154(b) by 335 days.

(21) Appl. No.: 14/893,351

(22) PCT Filed: Dec. 18, 2013

(86) PCT No.: PCT/CN2013/089830
§ 371 (c)(1),
(2) Date: Nov. 23, 2015

(87) PCT Pub. No.: WO2014/190737
PCT Pub. Date: Dec. 4, 2014

(65) Prior Publication Data
US 2016/0123635 A1    May 5, 2016

(30) Foreign Application Priority Data

May 27, 2013 (CN) .......................... 2013 1 0203080

(51) Int. Cl.
*F25B 43/02* (2006.01)
*F25B 31/00* (2006.01)
(Continued)

(52) U.S. Cl.
CPC ............ *F25B 31/004* (2013.01); *F25B 13/00* (2013.01); *F25B 49/02* (2013.01);
(Continued)

(58) Field of Classification Search
CPC .................... F25B 49/02; F25B 31/004; F25B 2313/0233; F25B 2600/02; F25B 2600/2513; F25B 2313/0253; F25B 2313/02533; F25B 2600/0253; F25B 2500/16; F25B 2600/01; Y02B 30/741
See application file for complete search history.

(56) References Cited

U.S. PATENT DOCUMENTS 5,551,249 A * 9/1996 Van Steenburgh, Jr. .................... F25B 6/02
62/196.4
6,986,259 B2 * 1/2006 Takegami ............... F25B 13/00
62/192

(Continued)

FOREIGN PATENT DOCUMENTS

CN    102575884 A       1/2011
CN    102331125 A *     1/2012
(Continued)

OTHER PUBLICATIONS

Machine Translation of CN 102331125 A, Zheng (Jan. 2012).*

*Primary Examiner* — Martha Tadesse
(74) *Attorney, Agent, or Firm* — Colin P. Cahoon; Shaukat A. Karjeker; Carstens & Cahoon, LLP

(57) ABSTRACT

An oil return method for multi-split air conditioner in heating comprises steps of: S1, adjusting operation frequency f0 of a compressor (11) to a first preset oil return frequency f1, and simultaneously, adjusting open degree S0 of each indoor throttling element (22) to a preset oil return open degree; S2, measuring operation parameters of the air conditioner; S3, judging whether the air conditioner operates abnormally, jumping to Step S4 if so, or jumping to Step S5 if not; S4, exiting from oil return process, adjusting the operation frequency f0 of the compressor (11) to a second preset oil return frequency f2, judging whether the air conditioner operates abnormally, existing from the oil return process if so, or jumping to Step S5 if not; S5, ending the oil return process when oil return time reaches the oil return time t2.

18 Claims, 2 Drawing Sheets

(51) Int. Cl.
*F25B 13/00* (2006.01)
*F25B 49/02* (2006.01)

(52) U.S. Cl.
CPC ............... *F25B 2313/0233* (2013.01); *F25B 2313/0253* (2013.01); *F25B 2313/02533* (2013.01); *F25B 2500/16* (2013.01); *F25B 2600/01* (2013.01); *F25B 2600/02* (2013.01); *F25B 2600/0253* (2013.01); *F25B 2600/2513* (2013.01); *Y02B 30/741* (2013.01)

(56) References Cited

U.S. PATENT DOCUMENTS

| | | | |
|---|---|---|---|
| 9,285,148 B2* | 3/2016 | Kasagi | F25B 31/004 |
| 2003/0205052 A1* | 11/2003 | Kim | F25B 1/10 |
| | | | 62/228.1 |
| 2004/0159111 A1* | 8/2004 | Takegami | F25B 13/00 |
| | | | 62/84 |
| 2005/0284156 A1* | 12/2005 | Scarcella | F25B 31/004 |
| | | | 62/84 |
| 2012/0192581 A1* | 8/2012 | Kasagi | F25B 31/004 |
| | | | 62/192 |

FOREIGN PATENT DOCUMENTS

| | | | | |
|---|---|---|---|---|
| CN | 102338505 A | 2/2012 | | |
| CN | 102645057 A | 8/2012 | | |
| EP | 2256435 A1 * | 12/2010 | ............ | F25B 31/004 |
| EP | 3091310 A4 * | 3/2017 | ............. | F25B 13/00 |
| JP | 2007285559 A | 11/2007 | | |
| JP | 2011117626 A | 6/2011 | | |

\* cited by examiner

OIL RETURN METHOD FOR MULTI-SPLIT AIR CONDITIONING IN HEATING

CROSS REFERENCE TO RELATED APPLICATIONS

This application is a US 371 Application of PCT Patent Application No. PCT/CN2013/089830, entitled "Oil Return Method for Multi-split Air Conditioner in Heating", filed on Dec. 18, 2013, which claims priority to Chinese Patent Application No. 201310203080.6, entitled "Oil Return Method for Multi-split Air Conditioner in Heating", filed on May 27, 2013, the entire contents of which are incorporated herein by reference.

TECHNICAL FIELD

The present disclosure relates to controlling an air conditioner, more particularly, to an oil return method for multi-split air conditioner in heating.

BACKGROUND

In the prior art, when the multi-split air conditioner is in heating, because of the lower flow velocity of the refrigerant in the main gas pipe and in the gas pipe of the non-operating indoor unit, oil is apt to be accumulated in these segments of gas pipes, which will result in a hidden trouble of oil lack in the compressor, thereby causing insufficient lubrication. The compressor may operate abnormally if the situation is mild, and the compressor will be damaged if the situation is severe. In order to ensure the reliability of the air conditioner, oil return process must be performed after a period of time of heating operation.

In the prior art, the oil return method for multi-split air conditioner in heating commonly comprises steps of: switching the four-way valve to the refrigeration mode; returning the lubricating oil accumulated from the segments of gas pipes with the aid of the liquid refrigerant. With this kind of oil return method, during the oil return period, the indoor unit acts as an evaporator, meanwhile the indoor unit stops heating, and after the oil is returned, the air conditioner remains in a low pressure state for a period of time (namely, it takes a period of time for the air conditioner to establish the high pressure state). Therefore, during the oil return period, and at the early stage of heating before the high pressure state is established, the heating operation cannot be performed efficiently. Accordingly, the comfort in use of the multi-split air conditioner in heating will be affected due to this kind of oil return method. In order to solve this problem, some multi-split air conditioners adopt an oil return method of increasing the operation frequency of the compressor and increasing the step number of the throttling elements of the indoor units without the need of switching the four-way valve. This kind of oil return method will reduce influences of the oil return process on the comfort in use of the air conditioner in heating, but will more greatly affect the running of the multi-split air conditioner during oil return process.

SUMMARY OF THE INVENTION

In view of the prior art, the objective of the present disclosure is to provide an oil return method for multi-split air conditioner in heating, so as to ensure both the reliability and the persistent heating effect of the air conditioner, thereby improving the customer's comfort in use.

In order to solve the technical problem above, the present disclosure provides an oil return method for multi-split air conditioner in heating. The multi-split air conditioner comprises an outdoor unit and multiple indoor units connected in parallel. The outdoor unit comprises a compressor, a four-way valve, an outdoor heat exchanger, an outdoor throttling element and an outdoor fan. Each of the indoor units comprises an indoor heat exchanger and an indoor throttling element. The oil return method comprises the following steps:

S1. during heating operation, when oil return process is to be performed, without switching the four-way valve, adjusting an operation frequency f0 of the compressor to a first preset oil return frequency f1, and simultaneously, adjusting an open degree S0 of the indoor throttling element of each indoor unit of the indoor system to a preset oil return open degree;

S2. measuring operation parameters of the air conditioner;

S3. according to measured operation parameters and preset operation parameters of the air conditioner, judging whether the air conditioner operates abnormally or not; if the air conditioner operates abnormally, jumping to step S4; if the air conditioner operates normally, jumping to step S5;

S4. exiting from the oil return process; after a period of time t1, adjusting the operation frequency f0 of the compressor to a second oil return frequency f2, and simultaneously, adjusting the open degree S0 of each indoor throttling element of the indoor system to the preset oil return open degree, wherein, f2<f1; measuring the operation parameters during oil return process, and according to measured operation parameters of the air conditioner and the preset operation parameters of the air conditioner, judging whether the air conditioner operates abnormally or not; if the air conditioner operates abnormally, exiting from the oil return process; if the air conditioner operates normally, jump to step S5;

S5. measuring oil return time; if the oil return time reaches a preset oil return time t2, ending the oil return process.

In one of the embodiment, f2≥½×fmax, and fmax is the maximum operation frequency of the compressor.

In one of the embodiment, 3 Hz≤f1−f2≤7 Hz.

In one of the embodiment, the step of adjusting the operation frequency f0 of the compressor to the first preset oil return frequency f1 comprises:

comparing the operation frequency f0 with the first preset oil return frequency f1;

if f0<f1, adjusting the operation frequency f0 of the compressor to the first preset oil return frequency f1;

if f0≥f1, not adjusting the operation frequency f0 of the first compressor.

In one of the embodiment, the step of adjusting the open degree S0 of each indoor throttling element of the indoor system to the preset oil return open degree comprises:

judging whether each indoor unit of the indoor system stops running or not;

if any indoor unit stops running, adjusting the open degree S0 of the indoor throttling element of corresponding indoor unit of the indoor system to a first oil return open degree S1, wherein S1≥70%×Smax, and Smax is the maximum open degree of the indoor throttling element;

if no indoor unit stops running, comparing the open degree S0 of the indoor throttling element of corresponding indoor unit of the indoor system with a second oil return open degree S2; if S0<S2, adjusting the open degree S0 of the indoor throttling element of the corresponding indoor unit of the indoor system to the second oil return open degree S2; if S02≥S2, not adjusting the open degree S0 of the indoor throttling element of the corresponding indoor unit of the indoor system, wherein S2≥80%×Smax, and Smax is the maximum open degree of the indoor throttling element.

In one of the embodiment, the operation parameters of the air conditioner comprise one or more selecting from the group of high pressure values, exhaust gas temperatures and low pressure values.

In one of the embodiment, t1≥10 min.

In one of the embodiment, 3 min≤t2≤5 min.

In one of the embodiment, the oil return method further comprises a step of adjusting rotation speed of the outdoor fan, said step comprises:

measuring high pressure and low pressure of the air conditioner in the process of oil return process;

if saturation temperature corresponding to the high pressure is greater than 50° C. and saturation temperature corresponding to the low pressure is greater than 12° C., reducing the rotation speed of the outdoor fan;

if the saturation temperature corresponding to the high pressure is less than 40° C. and the saturation temperature corresponding to the low pressure is less than 0° C., increasing the rotation speed of the outdoor fan.

In one of the embodiment, the oil return method further comprises a step of adjusting the open degree of the outdoor throttling element, said step further comprises:

calculating superheat degree of the outdoor unit;

if the superheat degree of the outdoor unit is greater than or equals to 2° C., reducing the open degree of the outdoor throttling element;

if the superheat degree of the outdoor unit is greater than −1° C. and less than 2° C., maintaining the open degree of the outdoor throttling element;

if the superheat degree of the outdoor unit is less than or equals to −1° C., increasing the open degree of the outdoor throttling element.

In one of the embodiment, the oil return method further comprises:

during the heating operation, measuring down time of each non-operating indoor unit; if the down time reaches a preset down time, gradually increasing the open degree of the indoor throttling element of corresponding indoor unit to the preset oil return open degree; after a period of time t3, restoring increased open degree of the indoor throttling element of the corresponding indoor unit to an initial open degree.

As compared with the oil return method in the prior art, the oil return method for multi-split air conditioner in heating of the present disclosure takes into consideration of both the oil return effect and the reliability of the air conditioner, ensures the reliability of the air conditioner and the persistent heating effect as well, thereby improving the customer's comfort in use.

The elements are denoted as follows:

10. outdoor unit; 11. compressor; 12. liquid-vapor separator; 13. oil separator;

14. four-way valve; 15. outdoor heat exchanger; 16. outdoor throttling element;

17. outdoor fan; 20. indoor system; 21. indoor heat exchanger; 22. indoor throttling element.

DETAILED DESCRIPTION OF THE PREFERRED EMBODIMENTS

The present disclosure will be described in more details with reference to the accompanying figures and embodiments. It should be noted that various embodiments and the features thereof can be combined with each other under the condition of no conflict.

The First Embodiment

Figure 1:
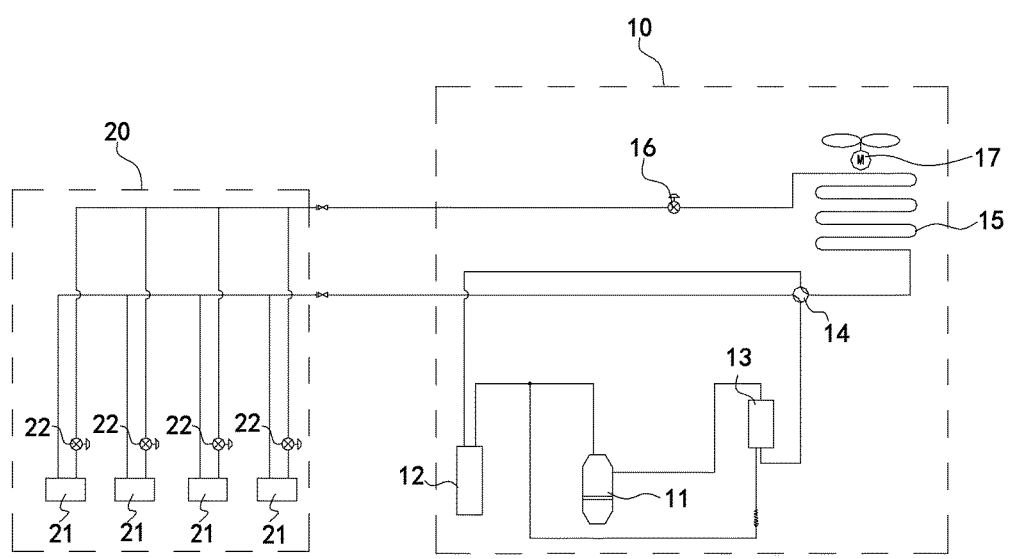
FIG. 1 is a system diagram of the multi-split air conditioner according to one embodiment of the present invention.

As shown in FIG. 1, in this embodiment, the multi-split air conditioner comprises an outdoor unit 10 and an indoor system 20 comprising multiple indoor units connected in parallel. The outdoor unit 10 comprises a compressor 11, a liquid-vapor separator 12, an oil separator 13, a four-way valve 14, an outdoor heat exchanger 15, an outdoor throttling element 16 and an outdoor fan 17. Each indoor unit of the indoor system 20 comprises an indoor heat exchanger 21 and an indoor throttling element 22. The compressor 11, the liquid-vapor separator 12, the oil separator 13, the four-way valve 14, the outdoor heat exchanger 15, the outdoor throttling element 16, the indoor heat exchangers 21 and the indoor throttling elements 22 are connected with pipes so as to form a refrigeration cycle. In this embodiment, the outdoor throttling element 16 and the indoor throttling element 22 are both electric expansion valves.

Figure 2:
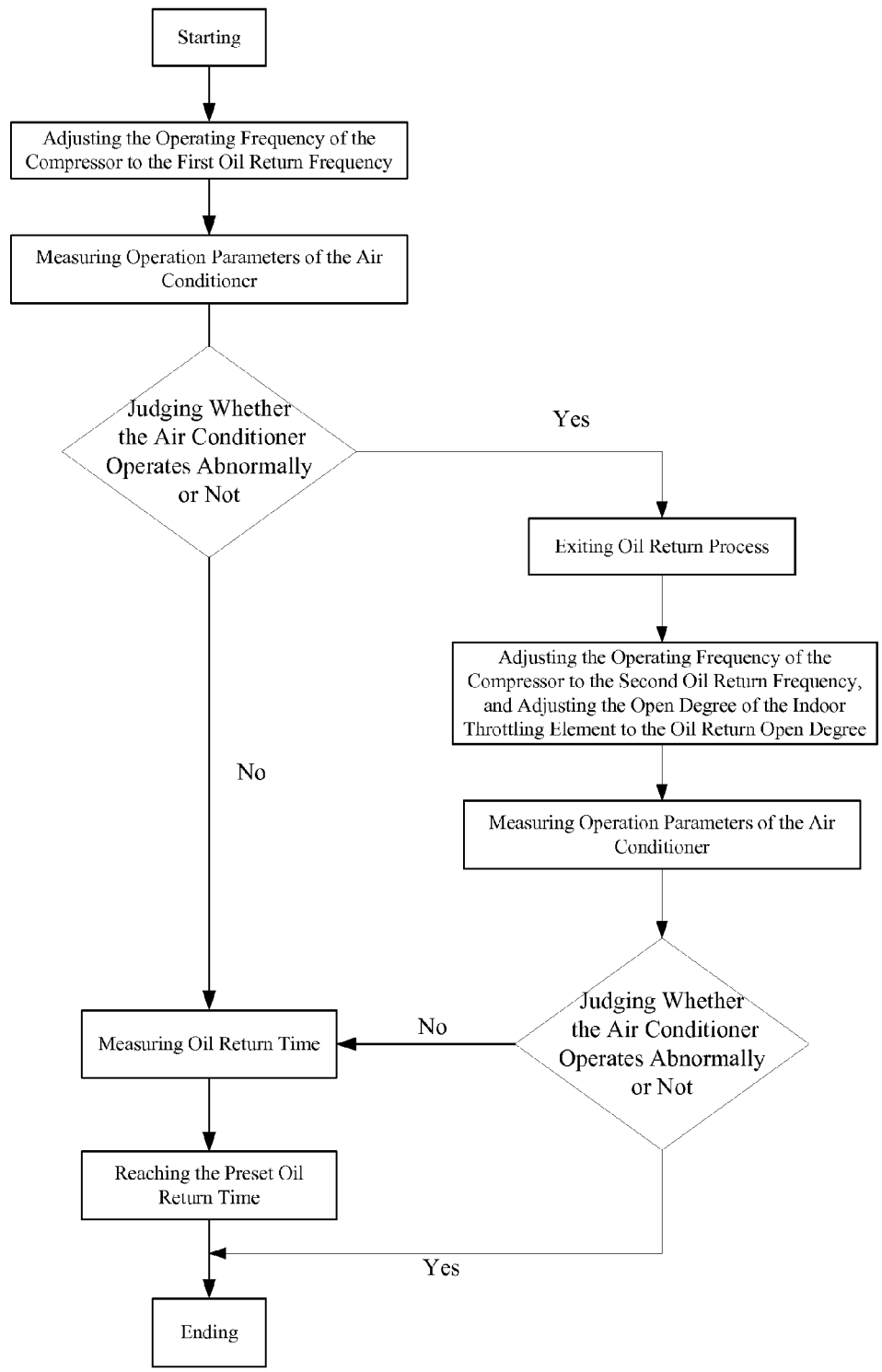
FIG. 2 is a flow chart illustrating the oil return method for multi-split air conditioner in heating according to one embodiment of the present invention.

As shown in FIG. 2, in this embodiment, the oil return method for multi-split air conditioner in heating comprises the following steps.

Step S1: During the heating operation, when oil return process is to be performed, without switching the four-way valve, adjust the operation frequency f0 of the compressor 11 to a first preset oil return frequency f1, and simultaneously adjust an open degree S0 of the indoor throttling element 22 of each indoor unit of the indoor system 20 to an preset oil return open degree. The compressor 11 runs at the first preset oil return frequency f1, which ensures that the flow velocity of the refrigerant in the air conditioner can reach a certain velocity that can drive the lubricating oil in the air conditioner to flow and further ensures the oil return effect. The step of adjusting the open degree S0 of the indoor throttling element 22 of each indoor unit of the indoor system 20 to the preset oil return open degree not only ensures that the high pressure during the oil return process will not be too high, but also ensures the increase of the flow velocity of the refrigerant in the gas pipes of the indoor units, thereby driving the lubricating oil in the segments of gas pipes of the indoor units to flow.

Preferably, the step of adjusting the operation frequency f0 of the compressor 11 to the first preset oil return frequency f1 comprises:

comparing the operation frequency f0 with the first preset oil return frequency f1;

if f0<f1, adjusting the operation frequency f0 of the compressor 11 to the first preset oil return frequency f1;

if f0≥f1, not adjusting the operation frequency f0 of the compressor 11.

Preferably, the step of adjusting the open degree S0 of each indoor throttling element 22 of the indoor system 20 to the preset oil return open degree comprises:

judging whether each indoor unit of the indoor system 20 stops running or not;

if any indoor unit stops running, adjusting the open degree S0 of the indoor throttling element 22 of corresponding indoor unit of the indoor system 20 to a first oil return open degree S1, wherein S1≥70%×Smax, and Smax is the maximum open degree of the indoor throttling element 22, so that the oil accumulated in the segment of the gas pipe of the indoor system 20 will participate in the refrigerant cycling to complete the oil return process.

if no indoor unit stops running, comparing the open degree S0 of the indoor throttling element 22 of corresponding indoor unit of the indoor system 20 with a second oil return open degree S2; if S0<S2, adjusting the open degree S0 of the indoor throttling element 22 of the corresponding indoor unit of the indoor system 20 to the second oil return open degree S2; if S0≥4 S2, not adjusting the open degree S0 of the indoor throttling element 22 of the corresponding indoor unit of the indoor system 20, wherein S2≥80%× Smax, and Smax is the maximum open degree of the indoor throttling element.

Therefore, the open degree of the indoor throttling element 22 of the operating indoor unit of the indoor system 20 is adjusted to over 80% of the maximum open degree. If the initial open degree is the maximum open degree, then it needs not to be increased any more. The indoor throttling element 22 of the non-operating indoor unit of the indoor system 20 is adjusted to over 70% of the initial open degree, which not only ensures the increase of the flow velocity of the refrigerant in the gas pipes of all indoor units of the indoor system 20, thus driving the lubricating oil in the segments of gas pipes of all indoor units of the indoor system 20 to flow, but also ensures that the high pressure during the oil return process will not be too high, and ensures the stable running of the air conditioner.

Step S2: Measure operation parameters of the air conditioner. Preferably, the operation parameters of the air conditioner comprise one or more selecting from the group of high pressure values, exhaust gas temperatures and low pressure values.

Step S3: According to measured operation parameters and the preset operation parameters of the air conditioner, judge whether the air conditioner operates abnormally or not. For example, during the oil return process, if the high pressure measured by the high pressure sensor (which is the pressure in the pipe segment between the compressor 11 exhaust and the oil separator, the same hereinafter) is greater than the preset high pressure (which is set to be 3.85 Mpa in this embodiment); or if the exhaust gas temperature is greater than the preset the exhaust gas temperature (which is set to be 105° C. in this embodiment); or if the low pressure measured by the low pressure sensor, (which is the pressure in the pipe segment between the oil separator 12 and the compressor 11 gas inlet, the same hereinafter) is less than the preset low pressure (which is set to be 0.168 Mpa in this embodiment), it is judged that the air conditioner is operating abnormally. If it is judged that the air conditioner is operating abnormally, jump to step S4; if it is judged that the air conditioner is operating normally, jump to step S5.

S4: Exit from the oil return process, namely, adjust the operation frequency of the compressor 11 to the normal operation frequency f0, and adjust the open degree of the indoor throttling element 22 of each indoor unit of the indoor system 20 to the normal oil return open degree S0. After a period of time t1 (preferably, 5 min≤t1≤15 min), adjust the operation frequency f0 of the compressor 11 to the second oil return frequency f2, and simultaneously, adjust the open degree S0 of all indoor throttling elements 22 of the indoor system 20 to the preset oil return open degree. Wherein, f2<f1. Preferably, 3 Hz≤f1−f2≤7 Hz. Preferably, f2≥½× fmax, wherein, fmax is the maximum operation frequency of the compressor 11. For example, the maximum operation frequency of the compressor 11 is 80 Hz, and the first oil return frequency f1 is 50 Hz. If the air conditioner exits the oil return process due to abnormal operation parameters, the second oil return frequency f2 is adopted after a period of time t1, and f2 is still greater than 40 Hz. During the oil return process, measure the operation parameters, and according to measured operation parameters of the air conditioner and the preset operation parameters of the air conditioner, judge whether the air conditioner operates abnormally or not; if the air conditioner operates abnormally, end the oil return process; if the air conditioner operates normally, jump to step S5.

Step 5: Measure the oil return time. If the oil return time reaches the preset oil return time t2, end the oil return process. Control the oil return time t2 according to the measured operation parameters of the air conditioner during the oil return process, so as to ensure the oil return effect and the reliability of the air conditioner as well. Preferably, 3 min≤t2≤5 min, and further, t2 is 4 minutes.

The Second Embodiment

The second embodiment is different from the first embodiment in that, preferably, t1≥10 min, and the oil return method for multi-split air conditioner in heating of the second embodiment further comprises the step of adjusting the rotation speed of the outdoor fan 17, which comprises:

measuring the high pressure and the low pressure of the air conditioner during the oil return process;

if the saturation temperature corresponding to the high pressure is greater than 50° C. and the saturation temperature corresponding to the low pressure is greater than 12° C., reducing the rotation speed of the outdoor fan 17;

if the saturation temperature corresponding to the high pressure is less than 40° C. and the saturation temperature corresponding to the low pressure is less than 0° C., increasing the rotation speed of the outdoor fan 17.

The adjustment for the operation of the fan 17 ensures the low pressure of the air conditioner and the high pressure as well. The control method described in the technical scheme ensures that the parameters of the air conditioner during oil return process are controlled in a reasonable range, and ensures the reliability and the heating effect of the air conditioner during the oil return process.

The Third Embodiment

The third embodiment is different from the first embodiment in that, the oil return method for multi-split air conditioner in heating of the third embodiment further comprises the step of adjusting the open degree of the outdoor throttling element 16, which further comprises:

calculating the superheat degree of the outdoor unit (namely, the temperature difference between the temperature of the gas pipe of the outdoor unit 10 and the temperature of the liquid pipe of the outdoor unit 10);

if the superheat degree of the outdoor unit is greater than or equals to 2° C., reducing the open degree of the outdoor throttling element 16;

if the superheat degree of the outdoor unit is greater than −1° C. and less than 2° C., maintaining the open degree of the outdoor throttling element 16;

if the superheat degree of the outdoor unit is less than or equals to −1° C., increasing the open degree of the outdoor throttling element 16.

As described in the technical scheme, the open degree of the outdoor throttling element 16 is adjusted according to the superheat degree of the outdoor unit, which ensures that, during the oil return process, the refrigerant remains at a proper superheat degree after passing through the heat exchanger 15, preventing too much liquid refrigerant from returning the compressor 11 and from further damaging the compressor 11 due to liquid slugging.

The Fourth Embodiment

The fourth embodiment is different from the first embodiment in that, the oil return method for multi-split air conditioner in heating of the fourth embodiment further comprises:

during the heating operation, measuring the down time of each non-operating indoor unit; if the down time reaches the preset down time (for example, one hour), gradually increasing the open degree of the indoor throttling element of corresponding indoor unit to the preset oil return open degree; after a period of time t3 (for example, 10 minutes), restoring the increased open degree of the indoor throttling element of the corresponding indoor unit to the initial open degree, so that the oil accumulated in the segments of gas pipes of the non-operating indoor units participates in the refrigerant cycling to complete the oil return process.

In conclusion, the oil return method for multi-split air conditioner in heating described in the embodiments of the present invention takes into consideration of both the oil return effect and the reliability of the air conditioner, ensures the reliability of the air conditioner and the persistent heating effect as well, thereby improving the customer's comfort in use.

What described above are several embodiments of the present invention, and they are specific and in details, but not intended to limit the scope of the present invention. It will be understood by those skilled in the prior art that various modifications and improvements can be made without departing from the scope of the present invention. Therefore, the scope of the present invention is defined by the appending claims.

What is claimed is:

1. An oil return method for a multi-split air conditioner in heating, wherein, the multi-split air conditioner comprises an outdoor unit, and an indoor system comprising multiple indoor units connected in parallel; the outdoor unit comprises a compressor, a four-way valve, an outdoor heat exchanger, an outdoor throttling element and an outdoor fan; each indoor unit of the indoor system comprises an indoor heat exchanger and an indoor throttling element; wherein, the oil return method comprises following steps:

during heating operation, when oil return process is to be performed, without switching the four-way valve, adjusting an operation frequency f0 of the compressor to a first preset oil return frequency f1, and simultaneously, adjusting an open degree S0 of the indoor throttling element of each indoor unit of the indoor system to a preset oil return open degree;

measuring operation parameters of the air conditioner;

according to measured operation parameters and preset operation parameters of the air conditioner, judging whether the air conditioner operates abnormally or not; if the air conditioner operates abnormally, jumping to a step of exiting from the oil return process, here below; if the air conditioner operates normally, jumping to a step of measuring oil return time, here below;

exiting from the oil return process; after a period of time t1, adjusting the operation frequency f0 of the compressor to a second oil return frequency f2, and simultaneously, adjusting the open degree S0 of each indoor throttling element of the indoor system to the preset oil return open degree, wherein, f2<f1; measuring the operation parameters during the oil return process, and according to measured operation parameters of the air conditioner and the preset operation parameters of the air conditioner, judging whether the air conditioner operates abnormally or not; if the air conditioner operates abnormally, ending the oil return process; if the air conditioner operates normally, jumping to a step of measuring oil return time, here below; and measuring oil return time; if the oil return time reaches a preset oil return time t2, ending the oil return process;

wherein, the step of adjusting the open degree S0 of each indoor throttling element of the indoor system to the preset oil return open degree comprises:

judging whether each indoor unit of the indoor system stops running or not;

if any indoor unit stops running, adjusting the open degree S0 of the indoor throttling element of corresponding indoor unit of the indoor system to a first oil return open degree S1, wherein S1≥70%×Smax, and Smax is the maximum open degree of the indoor throttling element;

if no indoor unit stops running, comparing the open degree S0 of the indoor throttling element of corresponding indoor unit of the indoor system with a second oil return open degree S2; if S0<S2, adjusting the open degree S0 of the indoor throttling element of the corresponding indoor unit of the indoor system to the second oil return open degree S2; if S0≥S2, not adjusting the open degree S0 of the indoor throttling element of the corresponding indoor unit of the indoor system, wherein S2≥80%×Smax, and Smax is the maximum open degree of the indoor throttling element.

2. The oil return method according to claim 1, wherein, f2≥½×fmax; and fmax is the maximum operation frequency of the compressor.

3. The oil return method according to claim 1, wherein, 3 Hz≤f1−f2≤7 Hz.

4. The oil return method according to claim 1, wherein, the step of adjusting the operation frequency f0 of the compressor to the first preset oil return frequency f1 comprises:

comparing the operation frequency f0 with the first preset oil return frequency f1;

if f0<f1, adjusting the operation frequency f0 of the compressor to the first preset oil return frequency f1;

if f0≥f1, not adjusting the operation frequency f0 of the first compressor.

5. The oil return method according to claim 1, wherein, the operation parameters of the air conditioner comprise one or more selecting from the group of high pressure values, exhaust gas temperatures and low pressure values.

6. The oil return method according to claim 1, wherein, t1≥10 min.

7. The oil return method according to claim 1, wherein, 3 min≤t2≤5 min.

8. The oil return method according to claim 1, further comprising:

during the heating operation, measuring down time of each non-operating indoor unit; if the down time reaches a preset down time, gradually increasing the open degree of the indoor throttling element of corresponding indoor unit to the preset oil return open degree; after a period of time t3, restoring increased open degree of the indoor throttling element of the corresponding indoor unit to an initial open degree.

9. An oil return method for a multi-split air conditioner in heating, wherein, the multi-split air conditioner comprises an outdoor unit, and an indoor system comprising multiple indoor units connected in parallel; the outdoor unit comprises a compressor, a four-way valve, an outdoor heat exchanger, an outdoor throttling element and an outdoor fan; each indoor unit of the indoor system comprises an indoor heat exchanger and an indoor throttling element; wherein, the oil return method comprises following steps:

during heating operation, when oil return process is to be performed, without switching the four-way valve, adjusting an operation frequency f0 of the compressor to a first preset oil return frequency f1, and simultaneously, adjusting an open degree S0 of the indoor throttling element of each indoor unit of the indoor system to a preset oil return open degree;

measuring operation parameters of the air conditioner;

according to measured operation parameters and preset operation parameters of the air conditioner, judging whether the air conditioner operates abnormally or not; if the air conditioner operates abnormally, jumping to a step of exiting from the oil return process, here below, if the air conditioner operates normally, jumping to a step of measuring oil return time here below;

exiting from the oil return process; after a period of time t1, adjusting the operation frequency f0 of the compressor to a second oil return frequency f2, and simultaneously, adjusting the open degree S0 of each indoor throttling element of the indoor system to the preset oil return open degree, wherein, f2<f1; measuring the operation parameters during the oil return process, and according to measured operation parameters of the air conditioner and the preset operation parameters of the air conditioner, judging whether the air conditioner operates abnormally or not; if the air conditioner operates abnormally, ending the oil return process; if the air conditioner operates normally, jumping to a step of measuring oil return time, here below;

measuring oil return time; if the oil return time reaches a preset oil return time t2, ending the oil return process; and adjusting rotation speed of the outdoor fan, by measuring high pressure and low pressure of the air conditioner during the oil return process; such that if:

(a) saturation temperature corresponding to the high pressure is greater than 50° C. and saturation temperature corresponding to the low pressure is greater than 12° C., reducing the rotation speed of the outdoor fan; and (b) the saturation temperature corresponding to the high pressure is less than 40° C. and the saturation temperature corresponding to the low pressure is less than 0° C., increasing the rotation speed of the outdoor fan.

10. An oil return method for a multi-split air conditioner in heating, wherein, the multi-split air conditioner comprises an outdoor unit, and an indoor system comprising multiple indoor units connected in parallel; the outdoor unit comprises a compressor, a four-way valve, an outdoor heat exchanger, an outdoor throttling element and an outdoor fan; each indoor unit of the indoor system comprises an indoor heat exchanger and an indoor throttling element; wherein, the oil return method comprises following steps:

during heating operation, when oil return process is to be performed, without switching the four-way valve, adjusting an operation frequency f0 of the compressor to a first preset oil return frequency f1, and simultaneously, adjusting an open degree S0 of the indoor throttling element of each indoor unit of the indoor system to a preset oil return open degree;

measuring operation parameters of the air conditioner;

according to measured operation parameters and preset operation parameters of the air conditioner, judging whether the air conditioner operates abnormally or not; if the air conditioner operates abnormally, jumping to a step of exiting from the oil return process, here below, if the air conditioner operates normally, jumping to a step of measuring oil return time here below;

exiting from the oil return process; after a period of time t1, adjusting the operation frequency f0 of the compressor to a second oil return frequency f2, and simultaneously, adjusting the open degree S0 of each indoor throttling element of the indoor system to the preset oil return open degree, wherein, f2<f1; measuring the operation parameters during the oil return process, and according to measured operation parameters of the air conditioner and the preset operation parameters of the air conditioner, judging whether the air conditioner operates abnormally or not; if the air conditioner operates abnormally, ending the oil return process; if the air conditioner operates normally, jumping to a step of measuring oil return time, here below;

measuring oil return time; if the oil return time reaches a preset oil return time t2, ending the oil return process; and adjusting the open degree of the outdoor throttling element by calculating superheat degree of the outdoor unit such that if:

(a) the superheat degree of the outdoor unit is greater than or equals to 2° C., reducing the open degree of the outdoor throttling element;

(b) the superheat degree of the outdoor unit is greater than −1° C. and less than 2° C., maintaining the open degree of the outdoor throttling element;

(c) the superheat degree of the outdoor unit is less than or equals to −1° C., increasing the open degree of the outdoor throttling element.

11. The oil return method according to claim 9, wherein, f2≥½×fmax; and fmax is the maximum operation frequency of the compressor.

12. The oil return method according to claim 9, wherein, 3 Hz≤f1−f2≤7 Hz.

13. The oil return method according to claim 9, wherein, t1>10 min.

14. The oil return method according to claim 9, wherein, 3 min≤t2≤5 min.

15. The oil return method according to claim 10, wherein, f2≥½×fmax; and fmax is the maximum operation frequency of the compressor.

16. The oil return method according to claim 10, wherein, 3 Hz≤f1−f2≤7 Hz.

17. The oil return method according to claim 10, wherein, t1>10 min.

18. The oil return method according to claim 10, wherein, 3 min<t2<5 min.

* * * * *